Jan. 24, 1956  R. T. ANDERSON  2,731,942
APPARATUS FOR BREADING SHRIMP
Filed Feb. 9, 1954  3 Sheets-Sheet 1

INVENTOR
R. T. Anderson,
By
ATTORNEYS

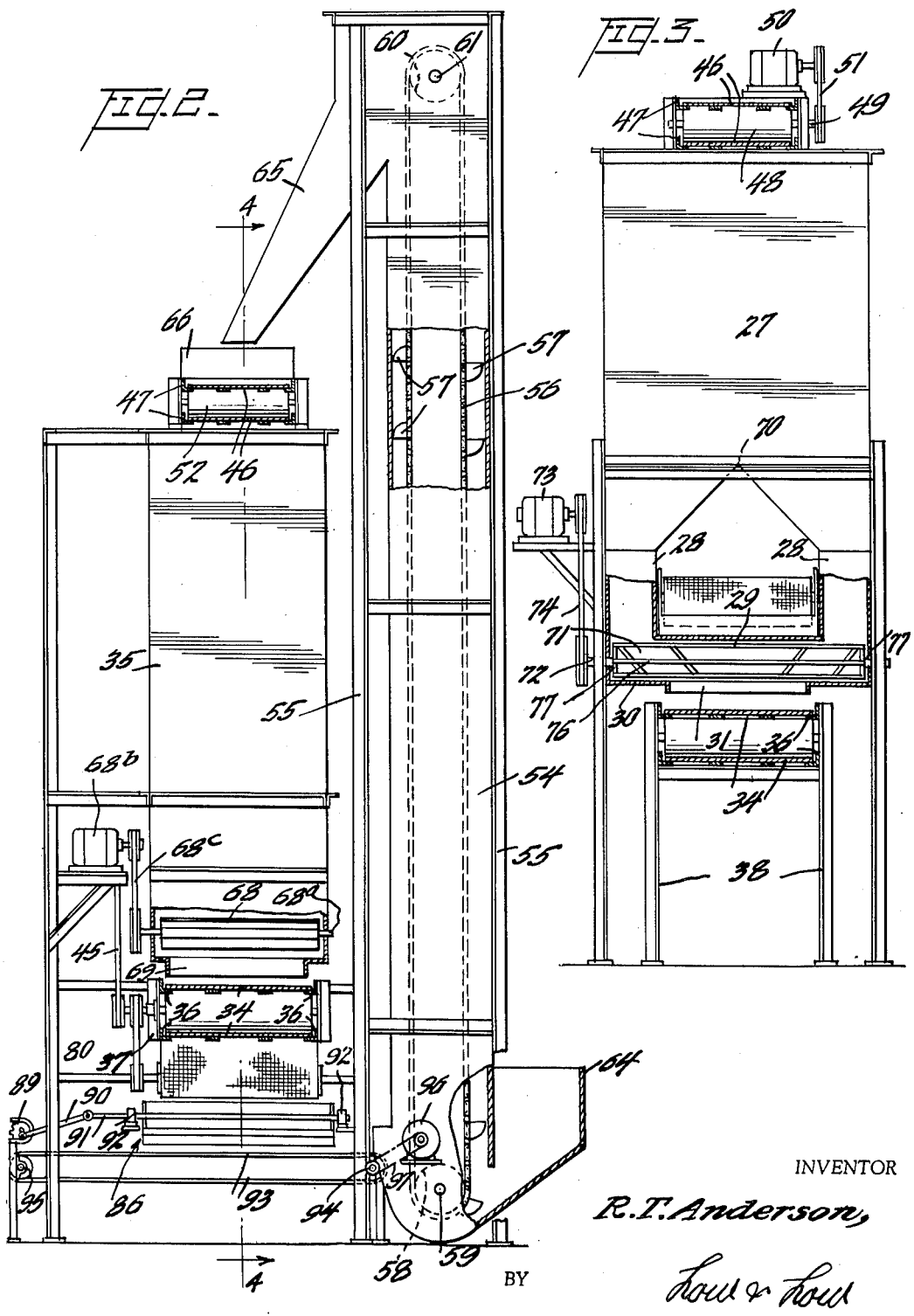

Jan. 24, 1956  R. T. ANDERSON  2,731,942
APPARATUS FOR BREADING SHRIMP
Filed Feb. 9, 1954  3 Sheets-Sheet 3
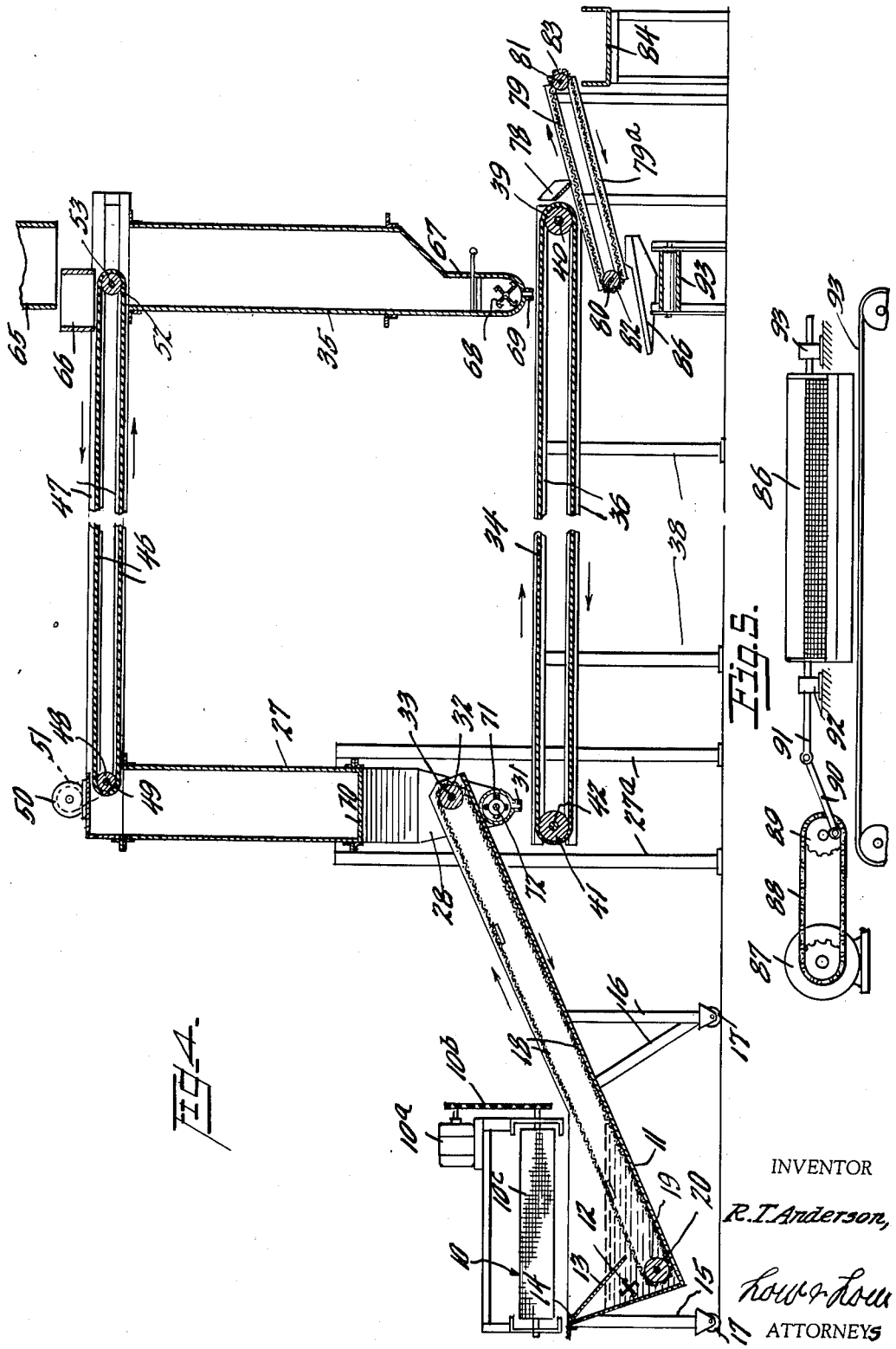
INVENTOR
R. T. Anderson,
ATTORNEYS

United States Patent Office 2,731,942
Patented Jan. 24, 1956

2,731,942

APPARATUS FOR BREADING SHRIMP

Robert T. Anderson, Brunswick, Ga., assignor to Colter Corporation, Palacio, Tex., a corporation of Texas Application February 9, 1954, Serial No. 409,102

5 Claims. (Cl. 118—16)

The invention relates to an apparatus for moistening and breading shrimp to condition the product for final packaging, and has for its objects to provide certain new and useful improvements in procedure and machines of this character.

An object of the invention is to provide an apparatus for treating shrimp which is automatic and continuous in operation, and wherein the machine or apparatus is composed of relatively few parts which may be assembled and coordinated for the purpose described with a minimum of effort and attendant expense.

A further object of the invention is to provide in the machine means for continuously advancing moistened shrimp from a coating or batter bath to beneath spaced breading hoppers, whereby the moistened shrimp are first coated with meal on their bottom surfaces, and thereafter similarly covered on their upper surfaces and pressed into desirable "butterfly" or "patty" shape for final packaging or for further treatment after their discharge from the machine.

A further and important object is to provide in the machine means for automatically feeding the shrimp breading meal from a supply source in substantial equal proportions to a vertically disposed hopper for coating the under surfaces of the shrimp, and to a separate vertically disposed and horizontally spaced hopper for effectually coating the upper exposed surfaces of the product with the breading meal.

A further object is to provide in the machine means for distributing the meal in uniform quantities transversely over the upper surface of a shrimp advancing conveyor prior to deposit of the shrimp thereon, for breading the under surfaces of the product, and thereafter to uniformly distribute an equal portion of the meal across the conveyor at a longitudinally spaced locality, to the end that the meal will be similarly applied to the upper shrimp surfaces in substantially uniform and constant amounts.

A further and important object is to provide in the machine means for collecting the surplus meal fed to the respective hopper devices and thence to the shrimp conveyor means, and reconditioning the surplus meal for continued use in the apparatus for coating subsequent shrimp automatically fed from a moistening batter bath to the breading apparatus.

The invention further contemplates means for automatically discharging from the machine the larger lumps of used meal, as well as small particles of broken shrimp which are not desirable to be included with the product for ultimate packaging or freezing purposes.

Numerous other objects and advantages of the invention will be apparent as it is better understood from the following description which, taken in connection with the accompanying drawings, discloses a preferred embodiment thereof.

In said drawings:

Fig. 2 is a vertical sectional view with parts shown in elevation, taken on line 2—2 of Fig. 1.

Fig. 3 is a similar view taken on line 3—3 of Fig. 1.

Fig. 4 is a longitudinal vertical sectional view of the machine taken on line 4—4 of Fig. 2.

Fig. 5 is a detail view of the shaker screen mechanism as seen in part at the bottom of Fig. 2.

Figure 1:
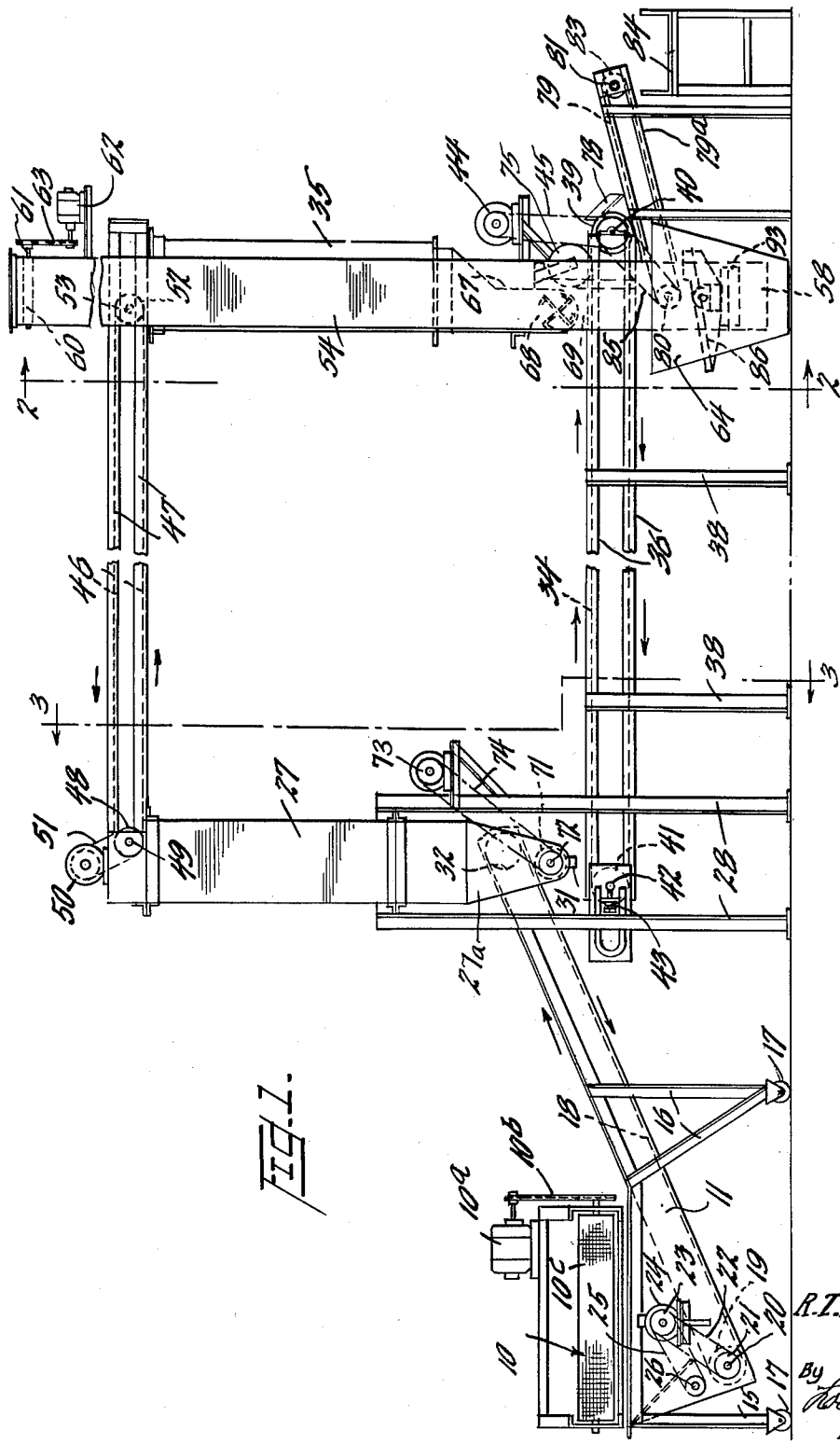
Fig. 1 is a view in side elevation of a preferred embodiment of the machine.

Referring to the drawings, the shrimp to be treated and breaded by the machine are fed haphazardly and in indiscriminate fashion by an endless conveyor belt 10 (Figs. 1 and 4) to a cold liquid batter bath contained within a reservoir or tank 11. In this bath the batter is maintained stirred and commingled by a power driven rotary agitator device 12 (Fig. 4) having radially extending vanes thereon. The feed-in conveyor 10 may be driven by an electric motor 10a through a flexible driving connection 10b between the motor and a sprocket mounted on the shaft of the conveyor roll 10c.

A perforated plate member 13 is hingably mounted at 14 to a wall of the batter tank, and the free end of the plate is partially submerged in the batter over the agitator 12 to maintain the shrimp out of contact with the agitator device.

The tank 11 is preferably of V-shape in cross-section and is supported by movable roller mounted standards or frame members 15 and 16, the supporting rollers of which are indicated at 17. The batter bath preferably consists of a formula of powdered egg batter and water which is introduced at intervals into the tank 11, from a separate automatic mixing device (not shown). Thus the batter material comprises essentially a fluid dip which serves to moisten and partially impregnate the shrimp in the tank, so that the product will readily adhere to the breading material or meal thereafter applied thereto.

An endless flexible inclined conveyor belt 18 preferably of woven mesh stainless steel, is supported at one end by a roller 19 submerged in the batter bath, said roller being mounted on a drive shaft 20 journaled at its opposite ends in the tank walls and having a drive sprocket 21 around which passes a chain 22 in turn mounted at its upper end on a sprocket 23 driven by a power source, such as an electric motor 24, at one end side of the tank. A second driving connection or chain 25 leading from the motor to the drive shaft 26 of the agitator 12 serves to drive the latter for maintaining the batter in its desired uniform fluid consistency.

A vertically disposed breading meal hopper 27 is supported by vertical standards or frame members 27a at the forward end of the machine, said hopper being open at its upper end and transversely divided or bifurcated at its lower end (Fig. 3) to provide a pair of transversely spaced depending leg portions 28 communicating at their lower ends with a passage 29 also extending transversely of the hopper. The bottom wall 30 of the hopper is provided with a central discharge opening 31 for breading meal passing downwardly by gravity through the hopper in a manner hereinafter described.

The upper end of the inclined feed conveyor 18 is carried by a roller or sprocket member 32 mounted on a driven shaft 33 journaled in bearings supported by the inner walls of the depending hopper leg members 28. In this manner the shrimp moistened and coated in the batter bath are conveyed upwardly therefrom by the feed belt 18 and discharged between the hopper leg members 28 so as to fall by gravity onto a lower endless belt conveyor member 34 disposed beneath the hopper 27 and extending longitudinally and horizontally of the machine to also advance beneath a second vertically extending hopper 35 open at its upper end and disposed at the rear end of the machine.

The upper and lower runs of the lower endless conveyor 34 are supported by opposed vertically spaced longitudinal channel members 36 of a box-like frame or table support 37, to insure the travel of the conveyor runs in opposite directions in straight horizontal paths of travel without sagging. The conveyor support 37 is in turn mounted on a plurality of upright frame members or floor supports 38 disposed intermediately of the conveyor. The leading end of the conveyor 34 passes over a roller and drive sprocket 39 carried by a drive shaft 40 journaled in suitable bearings on the table support 37 at one end of the latter. The trailing end of the lower conveyor 34 in turn passes over an idler roller and sprocket 41 on a driven shaft 42 movably journaled in the table at the opposite end thereof. A conventional take-up device indicated at 43 is provided for adjusting the tension of the belt conveyor 34 to insure the proper degree of tension and tautness in accordance with operating conditions and the volume and weight of the shrimp being transported thereby. Said lower conveyor belt 34 is preferably constructed of rubber or equivalent flexible material, and is driven as indicated by the arrows by an electric motor 44 or other equivalent power source through driving connection 45 connected to sprocket 39 on drive shaft 40.

An upper or top endless belt breading meal conveyor 46, also preferably constructed of rubber and designed to move longitudinally in a horizontal path of travel but in the reverse direction, is mounted upon and extends between the upper open ends of the hoppers 27 and 35. Suitable channel members or frame supports 47 are provided to maintain the conveyor belt runs against sagging and in horizontal paths of travel. One end of the conveyor 46 is supported by a roller 48 carried by a drive shaft 49 suitably journaled in the machine frame above the open end of hopper 27. Shaft 49 is driven by an electric motor 50 through a driving sprocket and chain connection 51 (Fig. 3) and in the direction of the arrows as indicated in Fig. 1. The rear or trailing end of the upper conveyor belt 46 passes over a sprocket driven idler roller 52 carried by a driven shaft 53 suitably journaled in the machine frame above the open upper end of hopper 35. A similar belt tensioning device of the character illustrated at 43 for the lower endless belt conveyor 44, may also be provided at this locality for the purpose of properly tensioning the upper belt conveyor 46.

As best seen in Figs. 1 and 4 it will be noted that the opposite ends of the upper conveyor belt 46 extend only partially across the upper open ends of the respective vertically disposed hoppers 27 and 35. This is in part for the purpose of discharging breading meal from the conveyor onto the open upper end of the hopper 27 (Figs. 1 and 4).

The machine is provided at its discharge end with a vertically disposed elevator housing 54 spaced transversely from the hopper 35 (Fig. 2), said housing being suitably supported and carried by vertical frame members or floor supports 55. The elevator housing 54 is substantially closed and houses an endless bucket conveyor consisting of a flexible chain driven belt 56 having spaced buckets 57 thereon. The lower driven end of the elevator passes over a sprocket driven roller 58 mounted on a drive shaft 59 suitably journaled in the housing walls. The upper end of the flexible bucket elevator passes over a chain and sprocket driven idler roller 60 carried by a drive shaft 61 suitably journaled in bearings in the housing walls. Said drive shaft in turn is driven by an electric motor 62 and interposed chain and sprocket driving connection 63, as best seen at the top of the elevator housing in Fig. 1.

The lower end of the elevator housing 54 (Figs. 1 and 2) is provided with a supply hopper 64 through which the prepared meal for breading the shrimp may be supplied and replenished when desired for upward transfer by the bucket elevator 56.

The top of the elevator housing 54 is provided with a depending discharge spout or chute 65 extending the full width of the elevator housing for the reception thereinto of meal carried upwardly by the elevator buckets, as the latter pass over the driven roller mounting. As best seen in Fig. 4, the lower co-extensive discharge end of spout 65 extends partially over the rear or trailing end of the upper conveyor belt 46 and partially over the upper end of the second receiving hopper 35. Preferably the open end of the discharge spout 65 extends for substantially one-half its length over the top conveyor belt 46, and for its remaining one-half dimension, the spout extends over the upper open end of the hopper 35.

A proportional divider plate indicated at 66 in the form of a box-like device serves to properly apportion or divide the meal discharged from the spout 65 into substantially equal proportions which are deposited respectively upon the trailing end of the belt conveyor 46 and into the open upper end of the hopper 35. The lower end of hopper 35 is of reduced dimension as indicated at 67 (Figs. 1 and 4), and is provided with a rotatable feeding and agitating device 68 journaled in the hopper walls for the purpose of progressively advancing the meal received by the hopper, to a central discharge opening or outlet 69 which extends transversely across and slightly above the lower shrimp conveying belt 34 adjacent the driven end thereof.

As best seen in Fig. 2 the rotatable hopper agitating member 68 is mounted on a shaft 68a journaled in the hopper walls and designed to be driven by an electric motor 68b and sprocket and chain driving connection with the shaft, indicated at 68c.

As best seen in Fig. 3 the spaced depending leg portions 28 of the forward or first encountered meal hopper 27 are connected by a sharply apexed angular deflector plate 70 disposed centrally of the hopper and upper meal conveyor belt 46, to the end that meal discharged into the hopper by said conveyor will fall by gravity and be diverted in substantially equal proportions into the depending hopper legs 28.

The lower portion of the hopper is provided with a rotatable agitator and meal distributing device 71 carried by a shaft 72 suitably journaled in bearings in the hopper walls and designed to be rotatably driven by an electric motor 73 and connecting chain and sprocket driving connection generally indicated at 74 in Fig. 3.

The agitator member 71 preferably consists of a series of square bars 76 mounted on the quarter points of two opposed disks 77. Mounted near the ends and adjacent the center of these bars are meal diverting paddle blades. As the agitator device revolves, these diverting blades convey the meal in opposite directions from the discharge ends of the leg members 28 to the central hopper discharge opening 31, whence the meal is uniformly deposited upon and transversely of the lower horizontal shrimp conveyor belt 34.

As best seen in Fig. 1, it will be noted that the meal deposited on and transversely across the belt conveyor 34 is received by the belt at a point immediately rearwardly of the location where the shrimp advanced by feed belt 18 from the batter bath, are deposited upon the conveyor belt 34. Thus the batter moistened shrimp so deposited fall upon a layer of meal previously received by the belt and are coated thereby on their under surfaces.

After being thus treated, the partially coated shrimp are further advanced by the lower conveyor belt 34 to beneath the discharge outlet 69 of the second breading meal hopper 35. Meal continuously falling by gravity toward and conducted through said outlet coats the shrimp on their upper surfaces, and thereafter the completely coated shrimp may be passed beneath a sponge rubber roller indicated at 75 in Fig. 1. The purpose of the positively or frictionally rotated sponge rubber roller is to press the shrimp downwardly onto the conveyor belt 34 to impart to the shrimp a desirable "butterfly" or "patty" shape. This is because the shrimp being treated usually have been previously split open and are packed accordingly. In the absence of the sponge rubber roller 75, the shrimp might assume a somewhat ragged appearance and the desirable "split open" configuration in the final packed product will not be so apparent to the ultimate consumer.

The batter moistened and meal coated shrimp are discharged by the belt 34 into a chute 78, and thence upon an inclined endless conveyor 79 carried by longitudinally spaced drive and driven shafts 80 and 81 having sprocket driven driving and idler rollers 82 and 83 mounted thereon (Fig. 4). Endless conveyor 79 is preferably of a porous or reticulated character for the purpose of shifting and passing surplus meal therethrough for subsequent reconditioning and return to the respective hoppers 27 and 35.

Said discharge conveyor 79 is preferably disposed above an inclined imperforate table support 79a, which latter serves to direct surplus meal passing through the porous conveyor 79 to devices to be described for reconditioning and redistributing the meal.

From the discharge end of conveyor 79 the shrimp are deposited in a receiving trough or transverse conveyor device 84 where the shrimp are in readiness for packaging into cans or suitable fibre or other containers to be frozen. Discharge conveyor 79 is driven as indicated from shaft 80 by means of a flexible driving connection 85 (Fig. 1) leading from driven shaft 40 of the lower shrimp advancing conveyor 34.

The downward inclination of the porous conveyor 79 aids in permitting surplus meal deposited thereon by conveyor 34, to move by gravity onto a shaker screen device indicated at 86. As illustrated the shaker screen 86 is also downwardly inclined or tilted so that large lumps of surplus meal and batter, as well as small particles of broken shrimp, are discharged over the edge of the screen and discarded.

The shaker screen 86 is continuously agitated by means of an electric motor 87 (Fig. 5) connected by a chain 88 to a sprocket 89 having a pitman 90 eccentrically mounted thereon. Rotation of the sprocket serves to continuously reciprocate the connected screen mounting shaft 91 within fixed and spaced pillow blocks 92 suitably supported in the machine frame beneath the rear end of the shrimp discharge conveyor.

The purpose of the shaker screen is to break up the moistened lumps of the surplus meal and sift the same through the screen onto a subjacent transverse conveyor device 93 (Fig. 2), mounted in the machine frame upon transversely spaced driving and driven shafts 94 and 95. Said conveyor is driven as indicated by an electric motor 96 having a driving connection 97 with the drive shaft 94 of the conveyor. In this manner the surplus meal is automatically broken up, reconditioned and returned to the bottom of the elevator housing 54 to be again elevated by the bucket conveyor 56 for distribution in substantially equal amounts into the open upper ends of the spaced forward and rear hoppers 35 and 27, the latter through the medium of the upper meal belt conveyor 46.

From the foregoing it will be seen that the instant machine is practically designed for continuous operation for moistening, breading and conditioning the shrimp for final packaging at the receiving trough or other discharge locality 84, or for transfer therefrom to any desired and appropriate shrimp packaging apparatus.

The original or reclaimed meal deposited into the bottom of the elevator housing 54 through the supply hopper 64 (Fig. 2) is conveyed by the bucket elevator 56 to the discharge spout 65. The latter serves to divide the meal in equal proportions, aided by the divider element 66, for respective delivery into the upper end of rearwardly disposed hopper 35, to be thereafter deposited on the upper surfaces of the shrimp advanced by the conveyor 34, and onto the rear end of the upper conveyor belt 46 for discharge thereby into the upper open end of the forwardly disposed hopper 27, for subsequent application to the forward end of shrimp conveyor belt 34. This is at a locality in advance of the feed of shrimp to the belt by the feed conveyor 18 as hereinabove described. The batter for coating and moistening the shrimp in the tank 11 is automatically mixed and fed to the tank in accordance with its rate of consumption, by a pump or control device (not shown). Provision is made as described for return of all surplus meal to the shaker screen 86 for reconditioning prior to its return by endless conveyor 93 to the bottom portion of the elevator housing 54.

Provision is also made as described for automatic discharge of the larger meal lumps and particles of shrimp over the shaker screen, to the end that the same will not be included with the breaded shrimp discharged by the conveyor 79 into the shrimp receiving trough or final discharge conveyor 84.

The various electric motors or power drive units for the several parts of the apparatus are capable of being synchronized with the movement of the parts, to the end that continuous and uninterrupted treatment of the shrimp is insured throughout the time the machine is in operation.

It is thought that the invention and many of its attendant advantages will be understood from the foregoing description, and it will be apparent that various changes may be made in the form, construction and arrangement of parts of the apparatus mentioned herein, without departing from the spirit and scope of the invention or sacrificing all of its material advantages, the apparatus and process hereinbefore described being merely a preferred embodiment thereof.

What is claimed is:

1. A machine for continuously breading shrimp, comprising a bath of liquid batter for moistening the shrimp, means for depositing shrimp in said bath, a pair of horizontally spaced hoppers respectively for applying breading material to the lower and upper surfaces of the moistened shrimp, conveyor means extending between and beneath said hoppers for advancing the moistened shrimp therebetween, a feed conveyor partially immersed in said bath for advancing the shrimp from said bath to said conveyor means, means for continuously supplying breading material to the upper ends of said hoppers, and means including an elevator means for collecting and reconditioning surplus breading material received by said conveyor means from said hoppers for return to the upper ends of said hoppers.

2. A machine for breading shrimp, comprising a plurality of spaced hoppers each open at its upper end for receiving breading material and having an opening at its lower end for discharging said material therefrom, a lower conveyor extending horizontally between and beneath said hoppers for advancing shrimp to be breaded therebetween, the foremost of said hoppers having depending leg members adjacent its lower end disposed transversely of and on opposite sides of said conveyor, a movable feed conveyor extending between said leg members for advancing shrimp to be breaded and depositing said shrimp on said conveyor means rearwardly of said hopper leg members, means communicating with the lower portions of said hopper leg members for conveying breading material in opposite directions transversely of said conveyor means for discharge through said hopper opening upon said conveyor means at a locality in advance of the deposited shrimp thereon by said feed conveyor, an upper breading material conveyor extending horizontally between the open upper ends of said hoppers for advancing breading material to said foremost hopper, means for supplying breading meal to the open upper end of the rearmost of said hoppers for breading the exposed shrimp surfaces, and means cooperating with said supplying means for diverting a portion of said meal to the trailing end of said upper conveyor for introduction thereby into the open upper end of said foremost hopper for breading the conveyor contacting shrimp surfaces.

3. A machine for continuously breading shrimp, comprising a batter bath for receiving and moistening the shrimp, a pair of horizontally spaced hoppers having open upper receiving ends and lower discharge ends for respectively applying breading meal successively to the lower and upper surfaces of the moistened shrimp, a lower conveyor extending horizontally between and beneath the lower discharge ends of said hoppers for advancing the moistened shrimp therebetween, a feed conveyor for advancing the moistened shrimp from said bath to said lower conveyor, and upper conveyor extending between the open upper ends of said hoppers, a meal elevator disposed adjacent one of said hoppers and communicating at its lower end with a source of meal supply, means at the upper end of said elevator for continuously depositing breading meal therefrom into the upper end of said one hopper and thence onto said lower conveyor, and a divider member disposed adjacent the discharge end of said depositing means for diverting a part of the meal therefrom onto said upper horizontal conveyor for transfer thereby to the upper receiving end of the other of said hoppers.

4. A machine for continuously breading shrimp, comprising a batter bath for receiving and moistening the shrimp, a pair of horizontally spaced hoppers having open upper receiving ends and lower discharge ends for respectively applying breading meal successively to the lower and upper surfaces of the moistened shrimp, a lower conveyor extending horizontally between and beneath the lower discharge ends of said hoppers for advancing the moistened shrimp therebetween, a feed conveyor partially immersed in said bath for advancing the moistened shrimp therefrom to said lower conveyor, an upper conveyor extending between the open upper ends of said hoppers, a bucket elevator disposed adjacent one of said hoppers and communicating at its lower end with a source of meal supply, means at the upper end of said elevator for continuously depositing breading meal therefrom into the upper end of said one hopper and thence onto said lower conveyor, means disposed adjacent the discharge end of said depositing means for diverting a part of the meal therefrom onto said upper horizontal conveyor for transfer thereby to the upper receiving end of the other of said hoppers, a shaker screen for collecting and reconditioning surplus breading meal deposited on said lower conveyor, and means for returning the reconditioned meal to said meal supply source for rerouting to the upper receiving ends of said hoppers in the manner described.

5. A machine for continuously breading shrimp, comprising a batter bath for receiving and moistening the shrimp, a pair of horizontally spaced hoppers having open upper receiving ends and lower discharge ends for respectively applying breading meal successively to the lower and upper surfaces of the moistened shrimp, a lower conveyor extending horizontally between and beneath the lower discharge ends of said hoppers for advancing the moistened shrimp therebetween, a feed conveyor partially immersed in said bath for advancing the moistened shrimp therefrom to said lower conveyor, an upper conveyor extending between the open upper ends of said hoppers, a bucket elevator disposed adjacent one of said hoppers and communicating at its lower end with a source of meal supply, means at the upper end of said elevator for continuously depositing breading meal therefrom into the upper end of said one hopper and thence onto said lower conveyor, a divider member disposed adjacent the discharge end of said depositing means for diverting a part of the meal therefrom onto said upper horizontal conveyor for transfer thereby to the upper receiving end of the other of said hoppers, a shaker screen for collecting and reconditioning surplus breading meal deposited on said lower conveyor, and conveyor means for returning the reconditioned meal to said meal supply source for rerouting to the upper receiving ends of said hoppers in the manner described.

References Cited in the file of this patent

UNITED STATES PATENTS

| | | |
|---|---|---|
| 1,966,268 | Steffen | July 10, 1934 |
| 2,119,909 | Ferry | June 7, 1938 |
| 2,347,164 | Petrilli | Apr. 18, 1944 |
| 2,659,338 | Harrison | Nov. 17, 1953 |
| 2,659,339 | Harrison | Nov. 17, 1953 |